March 14, 1967 A. C. LANGER 3,309,115

MECHANISM FOR REMOVABLY SECURING PANELS

Filed March 16, 1964 4 Sheets-Sheet 1

Inventor
Alfred C. Langer
Dominik & Stein
Attorneys

MECHANISM FOR REMOVABLY SECURING PANELS
Filed March 16, 1964 4 Sheets-Sheet 2
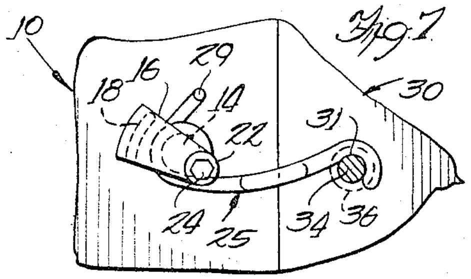
Fig. 7
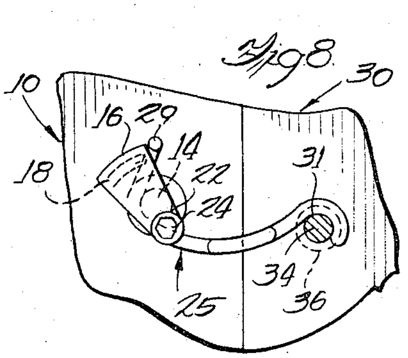
Fig. 8
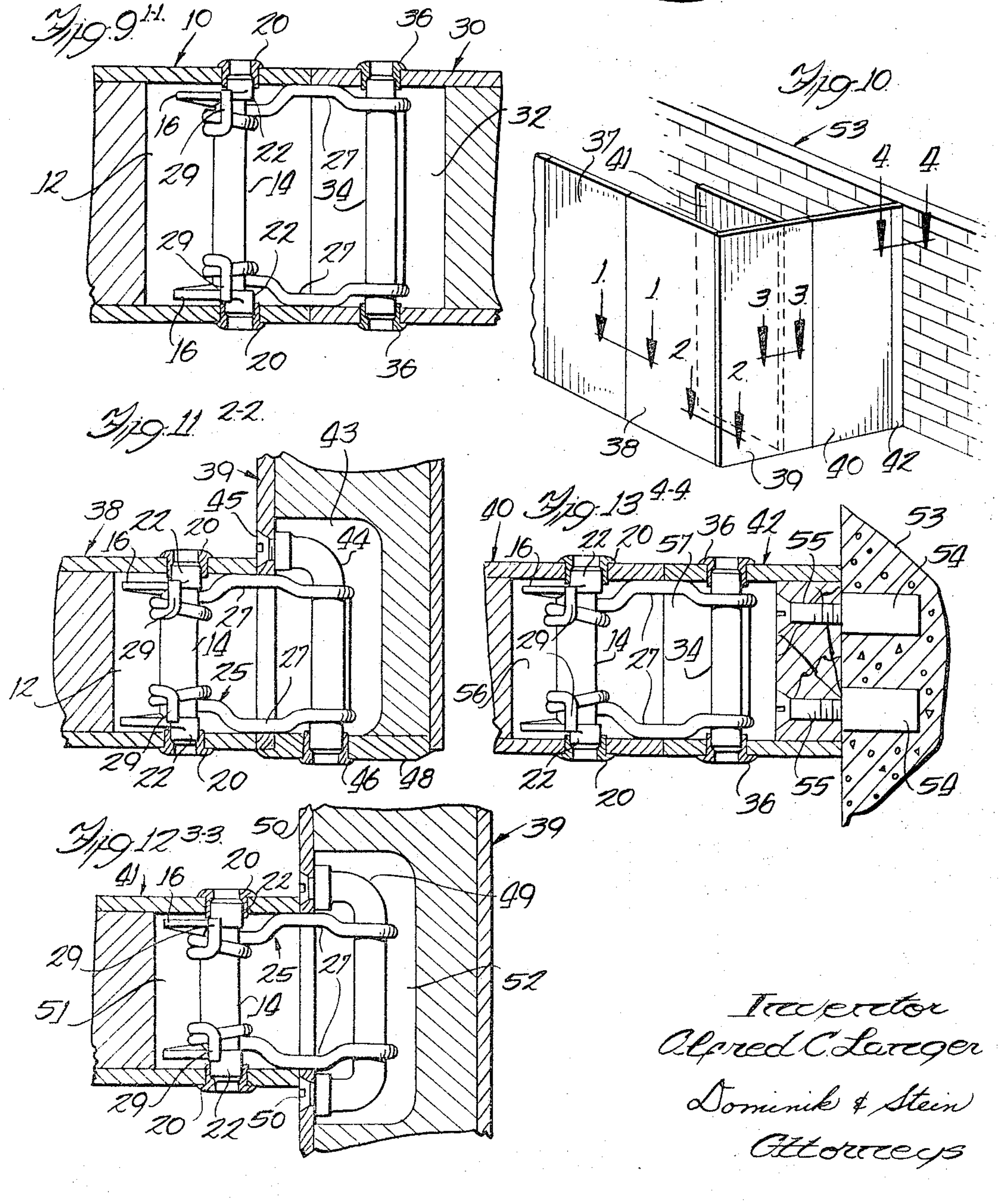
Fig. 9 1-1, Fig. 10, Fig. 11 2-2, Fig. 13 4-4, Fig. 12 3-3
Inventor
Alfred C. Langer
Dominik & Stein
Attorneys Inventor
Alfred C. Langer
Dominik & Stein
Attorneys

MECHANISM FOR REMOVABLY SECURING PANELS

Inventor
Alfred C. Langer
Dominik & Stein
Attorneys

United States Patent Office 3,309,115

Patented Mar. 14, 1967

3,309,115

MECHANISM FOR REMOVABLY SECURING PANELS

Alfred C. Langer, Pleasant Rise, Brookfield, Conn. 06804

Filed Mar. 16, 1964, Ser. No. 352,104
14 Claims. (Cl. 287—20.927)

This invention relates to a method and mechanism for removably securing panels, or other elements together.

For purposes of illustration this invention will be described with reference to its application to wall construction, although it is understood that it may be applied generally to attach other elements together when mating or complementary faces are present.

It is therefore the principal object of this invention to provide a method and mechanism for attaching panels, or other elements together. A related object is to furnish such a mechanism which is hidden from view by internal mounting thereby leaving an uninterrupted smooth panel face.

A further object of the invention is to provide a method and mechanism for drawing two panels together tightly and holding them in removably secured relationship indefinitely.

It is a further object of this invention to provide a mechanism for attaching panels together which may be easily installed in the factory, or in the field by persons without great skill, and without special tools.

It is a still further object of this invention to provide mechanism for attaching two panels together securely, which is operated by means of a common key or wrench.

It is a still further object of the invention to provide mechanism for attaching panels together which can be unlocked and which can be fully retracted from engagement or protrusion from one panel into the other. In this respect it is a still further object to provide mechanism of the above described type which permits the assembler or disassembler of the panels to separate, or engage the panels together again, without having additional space other than that which the panel itself occupies.

It is a still further object of this invention to provide a mechanism for attaching panels together which is fully retractable to allow any one panel in a wall of panels to be removed, and replaced, from its place laterally without alternating the position of the adjacent panels.

It is a still further object of this invention to provide a mechanism for attaching panels together which in the process of drawing the panels together also laterally aligns the panels to provide a smooth, uninterrupted surface.

It is a still further object of this invention to provide a mechanism for attaching panels, or other objects, together which can be readily manufactured in volume, quickly installed, be self-retaining when stored or transported, and will operate under adverse conditions.

Other objects of the invention will in part be obvious and will in part appear hereinafter.

The invention accordingly comprises the several steps and the relation of one or more of such steps with respect to each of the others and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, refeernce should be had to the following detailed description taken in conjunction with the accompanying drawings, in which:

FIGURE 1 is a pictorial view, in perspective, showing a cut-away portion of two panel members having secured therein mechanism, which is illustrative of the invention, for attaching the two panels together;

FIGURE 2 is an exploded perspective view of the mechanism;

FIGURES 3–8 are side views of the mechanisms, attached to two panels, showing the mechanism in various stages of operation, in securing the two panels together;

FIGURE 9 is a top sectional view taken along the lines 1—1, in FIGURE 10, which shows how the mechanism is used to end-butt the panels together and to laterally align the same;

FIGURE 10 is a pictorial view, in perspective, showing walls constructed of panels, using the mechanism illustrative of the present invention;

FIGURE 11 is a top sectional view taken along the lines 2—2, in FIGURE 10, showing how the mechanism may be used to butt the end of one panel to the face of another panel, to form a corner;

FIGURE 12 is a top sectional view taken along the lines 3—3, in FIGURE 10, showing how the mechanism may be used to butt the end of one panel to the face of another panel to form a partition wall;

FIGURE 13 is a top sectional view taken along the lines 4—4 showing how the mechanism is used to secure a panel to a brick or masonry wall;

Similar reference characters refer to similar parts throughout the several views of the drawings.

Figures 1, 2, 3, 4, 5, 6:
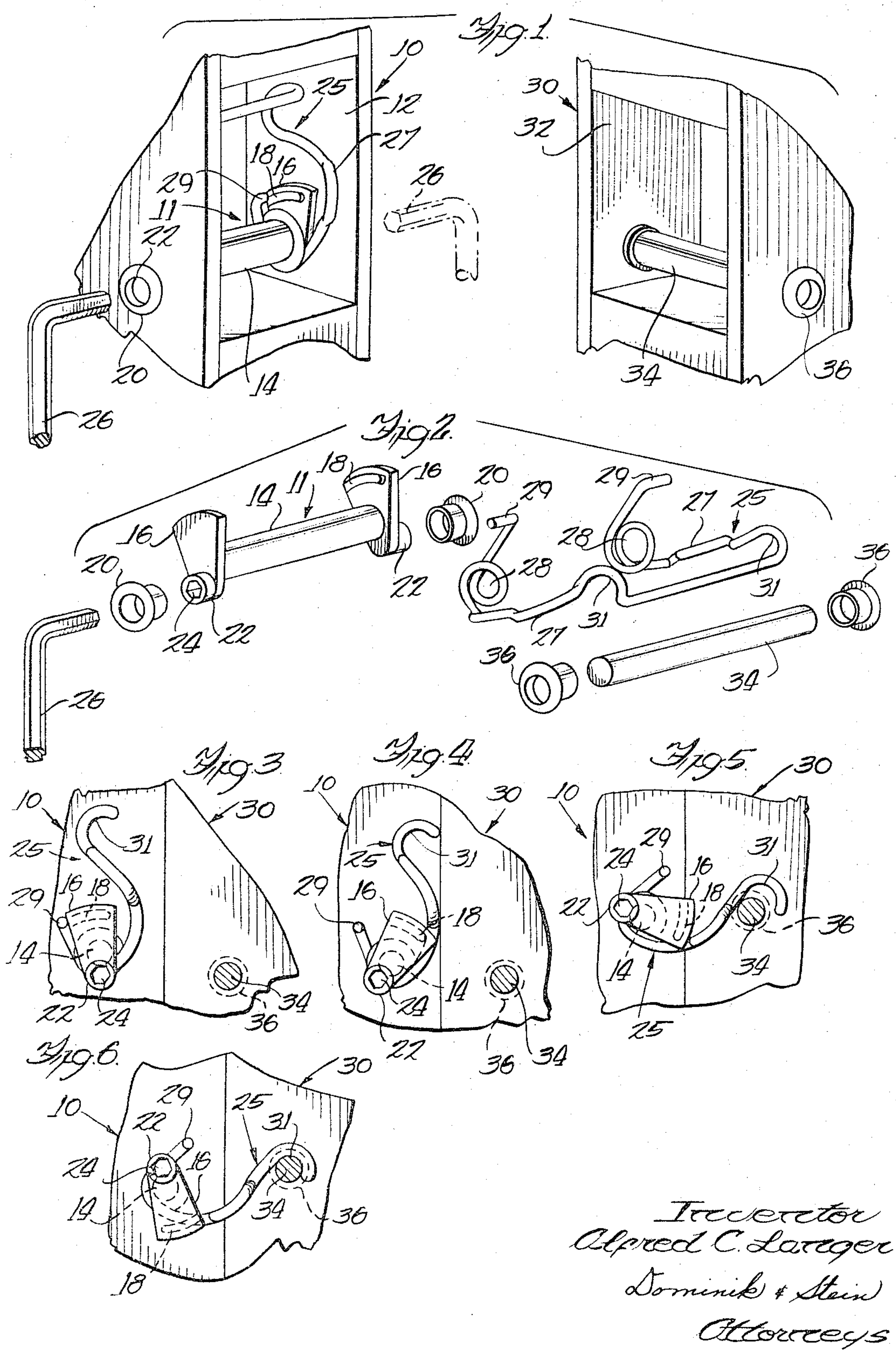

Referring now to FIG. 1, two panel members 10 and 30 which may be "cored" panels of the type used in wall construction are shown having cut-outs 12 and 32, respectively, in which there are secured mechanism illustrative of the present invention. This mechanism, as may be best seen in FIG. 2, comprises an actuator 11 including a shaft 14 having secured to its two ends, a fan-shaped pawl 16. Each of the pawls 16 has a circular shaft 22 connected thereto, at its more pointed tip, which form a pivot for the pawls. It may be noted that the shaft 14 is off-set with respect to the circular shafts 22 so as to be an eccentric. The pawls 16 also have a tapered boss 18 formed near the top of the fanned-out portion thereof, on the sides of the pawls which face each other.

A substantially U-shaped spring connecting latch 25 fabricated from a single piece of spring wire has a loop 28 formed in each of its arms for rotatably securing the spring to the shaft 14 of the actuator 11, as shown in FIG. 1. The spring 25 has a profile which is substantially an S curvature, as may be best seen in FIGS. 3–8. Each of the arms of the spring 25 has a tang 29 formed in its terminal end and an outwardly curved section 27 at substantially its midsection, as may be best seen in FIG. 9.

The actuator 11 with the spring 25 rotatably secured thereto is installed in the panel member 10 by inserting a pair of ferrules 20 through holes which are pre-drilled in the panel member 10 to engage the circular pivot shafts 22 formed on the pawls 16. The ferrules 20 are knurled, or threaded, for positive retention in the panel member 10, and act as both retainers and bearings for the circular pivot shafts 22 on the actuator 11. Also, the ferrules 20, as shown, are oval-headed, but they may be made flat counter-sink headed for applications where flush, or concealed (covered-over) installations are desired.

The circular pivot shafts 22 formed on the pawls 16 have a hexagonal-shaped aperture 24 formed therein for receiving the operating key 26 to rotate the actuator 11 to engage the spring connecting latching 25 with the stationary rod 34 installed in the panel member 30, in a manner to be described hereinafter. The circular pivot shafts 22 could also have square apertures formed therein, or be slotted, for different types of operating tools.

Installed in the panel member 30 in the cut-out 32 is a stationary bar 34 for receiving the spring connecting latching 25. The stationary bar 34 is secured therein by passing the ferrules 36 through the pre-drilled holes in the panel member 30 to engage its ends. As in the case of the ferrules 20, the ferrules 36 are likewise knurled, or threaded, for positive retention in the panel member 30.

Referring now to FIGS. 3–8, the operation of the mechanism in attaching two panel members together is shown and will be described in detail. The panels which are to be attached together, such as the panel members 10 and 30, are placed end to end, as shown in FIG. 3, and the hexagonal operating key 26 inserted in the hexagonal aperture 24 in the circular pivot shaft 22 connected to the pawl 16, and rotated. In FIG. 3, the actuator 11 and the spring connecting latching 25 are shown in their fully retracted position, in the panel member 10. As the actuator 11 is rotated, the tapered bosses 18 on the pawls 16 engage the arms of the spring connecting latch 25 to cause it to rotate with the actuator 11 until it contacts the stationary bar 34 in the panel member 30, as shown in FIG. 5. As the spring connecting latch 25 is being rotated, the outwardly curved sections 27 are forceably urged against the inner faces of the panel member 10 and 30 to automatically align these panels as the area of the outwardly curved sections 27 are forced across the line of contact between the panels 10 and 30 being joined.

Once the spring connecting latch 25 has contacted the stationary bar 34, the bosses 18 on the pawls 16, being tapered, are no longer effective to force the spring connecting latch 25 any further through its arc of travel. As the operator exerts continued force on the operating key 26, the pawls 16 must continue to turn about the circular pivot shafts 22, and the bosses 18 therefore cause the spring connecting latch 25 to flex inwardly at both boss contact points momentarily while the bosses 18 continue their travel, as shown in FIG. 6.

When the actuator 11 has been rotated approximately 180°, the eccentrically positioned shaft 14, upon which the two arms of the spring connecting latch 25 are coiled, pulls the spring coils 28 along with it through its arc of travel, thereby accomplishing positive engagement of the spring hooks 31 with the stationary rod 34, and creates tension on the spring connecting latch 25.

When the actuator 11 has been rotated to the point that the eccentrically positioned shaft 14 has passed its point of maximum distance from the stationary rod 34, the spring connecting latch 25, being under tension, tends to pull the shaft 14 towards the stationary shaft 34, thus aiding the eccentrically positioned shaft 14 in its travel. The tension on the spring connecting latch 25 would bring the eccentrically positioned shaft 14 around "full circle" if it were not for the locking tangs 29 formed on the terminal end of the arms of the spring connecting latch 25, which now engage the pawls 16 and completely arrest further rotation. In accordance with this invention, when the actuator 11 is in contact with the tangs 29 there is sufficient tension maintained on the spring connecting latch 25 to keep the ends of the panel members 10 and 30 in firm contact.

Also, with the spring connecting latch 25 being under a tension, the outwardly curved sections 27 have a tendency to straighten out slightly. The arms of spring connecting latch 25, however, are formed, in manufacturing, so that the tendency of the outwardly curved sections 27 to bow outwardly is sufficient to compensate for this straightening, which is the most pronounced when the eccentric shaft 14 is at its maximum distance from the stationary shaft 34, and to maintain a sufficient force against the inner faces of the panel members 10 and 30 to keep them in proper alignment. It is found that by the time the eccentric shaft 14 is at its maximum distance, the panel contact pressure is so high that panel misalignment is virtually impossible, even though the outwardly curved sections 27 are to a small degree straightened.

To disassemble the panels, the operating key 26 is merely rotated in a counter-clockwise direction approximately 360° to fully retract the actuator 11 and the spring connecting latch 25 into the cut-out 12 formed in the panel member 10. In this counter-rotation, the bosses 18 on the pawls 16, being tapered, slide past the arms of the spring connecting latch 25 with little effort. Full retraction of the spring connecting latch 25 is accomplished by the rear edge of the pawls 16 striking the tangs 29 formed in the terminal ends of the arms of the spring connecting latch 25, to cause the spring connecting latching 25 to be rotated in a counter-clockwise direction.

In FIG. 10 there is shown a number of panels 37–42 removably secured together by means of the mechanism of this invention to illustrate various types of walls which may be constructed by their use. In constructing these walls, normally two such mechanisms are used, one positioned at the top of the panel members and the other being positioned near the bottom of the panel members.

The panel members 37 and 38 are end-butted together by means of the mechanism, in the manner described above, to form a wall which may have a continuous series of panels. FIG. 9 is a cross-sectional view of these panel members, taken along the line 1—1, illustrating how the mechanism secures these panel members in the end-butt relation.

In FIG. 11 is shown a cross-sectional view taken along the line 2—2 to illustrate how the mechanism is used to removably secure two panel members together to form a corner. In this case, the actuator 11 and the spring connecting latch 25 are identical to those described above and are secured within the panel 38 in the same manner. The stationary bar 34, however, is replaced by the L-shaped stationary rod 44, which is secured within the cut-out 43 of the panel 39 by means of the screws or the like 45 passed through the panel member to retain one end of the L-shaped rod 44 and the ferrule 46 passed through an aperture in the panel end-closing insert 48 to retain the other end of the L-shaped rod 44.

The cross-sectional view taken along the line 3—3 in FIG. 10 is shown in FIG. 12, and illustrated how the mechanism may be used to butt the end of one panel to the face of another panel to form a partition wall. In this case, a U-shaped rod 49 is secured by means of the screws 50 within the cut-out 52 of the panel member 39. The panel member 41 is firmly held against the panel member 39 by means of the spring connecting latch 25, in the manner described above, and is held at a 90° angle with respect to the panel member 39 by means of the outwardly curved sections 27 formed in the arms of the spring connecting latch 25 which are forceably urged against the inner face of the panel member 41 and the edge of the cut-out of the panel member 39.

A panel member may also be secured to a brick or masonry wall by means of a small panel inset 42, as shown in FIG. 13 which is a sectional view taken along the line 4—4, in FIG. 10. The panel inset 42 is secured to the brick or masonry wall 53 by means of the screws or the like 55 which engage the plugs 54 set into the brick or masonry wall 53, in the manner well known in the art. The panel inset 42 need be only large enough to secure the stationary shaft 34 therein so that the outwardly curved sections 27 formed in the arms of the spring connecting latch 25 engage the inner faces of the panel member 40 and the panel inset 42 to properly align them.

Figure 14:
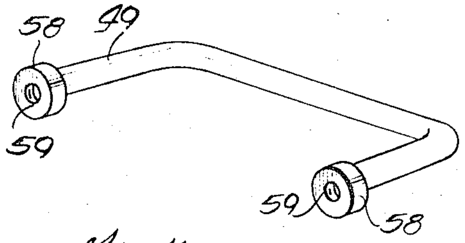
FIGURES 14–16 are perspective views of various types of stationary rods and brackets which may be used as stopping or anchoring means for the spring latch.
Figure 16:
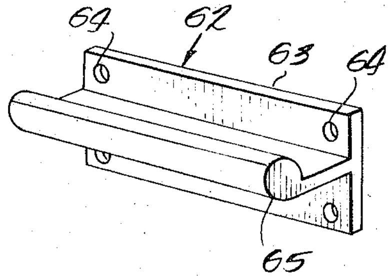
Figure 15:

In FIGS. 14–16 are shown a number of the accessories which may be used with the actuator 14 and the spring connecting latch 25 to form various types of walls. In FIG. 14 is shown the U-shaped rod 49 which is used to butt the end of one panel to the face of another panel, as shown in FIG. 12. The U-shaped rod 49 has enlarged circular members 58 having apertures 59 therein formed on the terminal ends of its arms. These apertures 59 may be threaded to receive a screw or the like to secure the rod to the panel member. The L-shaped rod 44 shown in FIG. 15 is used to butt the end of one panel to the face of another panel to form a corner, as shown in FIG. 11. The rod 44 has an enlarged circular member 60 having an aperture 61 therein formed on the terminal end of one of its legs, while its other end is free to receive a ferrule. The aperture 61 in the enlarged circular member 60 may be threaded to receive a screw or the like. The accessory bracket 62 shown in FIG. 16 may be used in place of the U-shaped rod 49, shown in FIG. 14, to secure the butt end of one panel to the face of another panel. The bracket 62 is secured by means of screws or the like passed through the aperture 64 to the rear wall of the cut-out formed in the panel. In this case, the portion of the spring connecting latch 25 extending between its two arms seats behind the enlarged circular member 65, but otherwise the operation is substantially the same as previously described.

Figure 17:
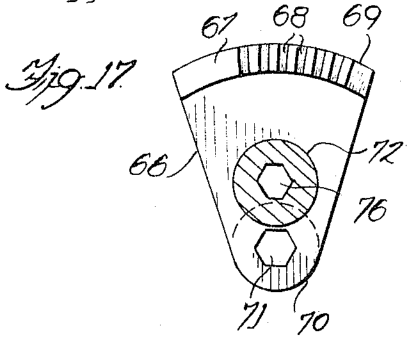
FIGS. 17 and 18 are front and top views, respectively, of a modified pawl for the attaching mechanism.
Figure 18:
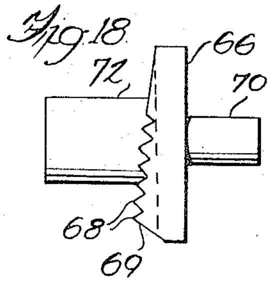

In FIGS. 17 and 18, the pawl section of a modified actuator 11 is shown. In this case, the pawls are formed as separate pieces and are connected by a hexagonal-shaped rod which slips into the similarly shaped aperture 76 formed in the small circular shaft 72. By producing the actuator 11 in three separate pieces, the mechanism is made far more versatile and may be more easily manufactured. For example, the actuator 11 may be easily adapted to be used in any width wall simply by using a shaft having the proper length. Also, by forming pawls as separate pieces they may be more easily manufactured through the method of powder metallurgy, or cold heading.

It is found in using attaching mechanism with panel members having a smooth or glassy inner faces that the spring connecting latch 25 may have a tendency to flex or "snap" in a counter-clockwise direction and disengage from the stationary shaft 14 when the bosses 18 on the pawls 16 travel pass the arms of the spring connecting latch 25. To prevent this from occurring, the bosses on the pawls may be notched, as boss 67 in FIG. 17 is formed with the notches 68, so that a forward drag is maintained on the arms of the spring connecting latch 25 as the bosses are rotated passed the arms. Since the bosses are tapered and notched, the counter-clockwise force tending to flex or "snap" the spring connecting latch 25 out of engagement with the stationary shaft 14 is gradually reduced. The bosses 67 on the pawl 66 also provide an indication to the operator of the position of the pawl, since he can "feel" the action of the bosses sliding past the arms of the spring connecting latch 25.

Figures 19, 21:
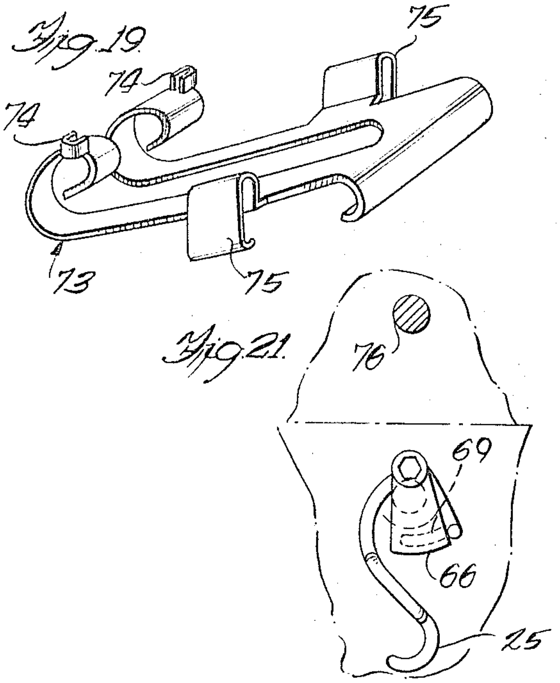
FIGS. 19 and 20 are front perspective and top views, respectively, of a sheet spring latch.
FIGURE 21 is a front view illustrating one form in which the invention may be used to secure objects, other than panels, together.
Figure 20:
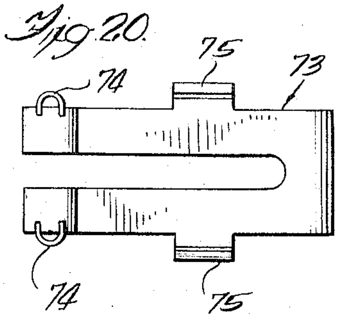
Figure 22:
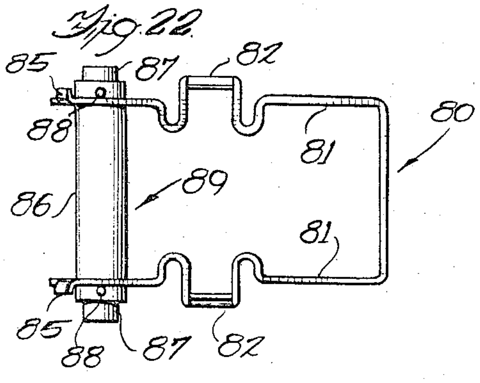
FIG. 22 is a plan view of an actuator and a spring connecting latch, exemplary of a second embodiment of the invention.

In FIGS. 19 and 20, a modified spring connecting latch 73 is shown fabricated from flat spring steel, rather than bar spring, as shown and described above. Spring connecting latch 73 may be stamped and formed from a single sheet of flat spring steel. The upwardly projecting tabs 74 which may be stamped, formed in a semi-circular shape and bent upwardly, as shown, function in the same manner as the tangs 29 formed on the terminal ends of the arms of the spring connecting latch 25, described above. The outwardly extending flanges 75, in this case, perform the function of the outwardly curved sections 27 formed in the arms of the spring connecting latch 25.

It follows from the detailed description above that the illustrated mechanism can be easily modified to attach two objects, other than panel members, together. For example, one such modification is shown in FIG. 21. In this example, only a single pawl, such as the pawl 66 shown in FIG. 17, and one arm of the spring connecting latch 25, shown in FIG. 2, is used. The one arm of the spring is rotated in the same manner as described above, that is, by means of the boss on the pawl, to engage the hook in the fastener means secured to the other object. The spring will be tensioned to securely attach the two objects, as the eccentric on the pawl passes through its arc of travel, as described above.

Figure 23:
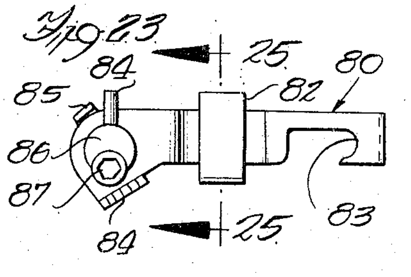
FIGURE 23 is a side plan view of the actuator and spring connecting latch of FIG. 22.
Figure 24:
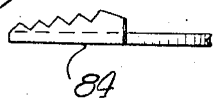
FIG. 24 is a view of the boss formed on each of the arms of the spring connecting latch of FIG. 22.
Figure 25:
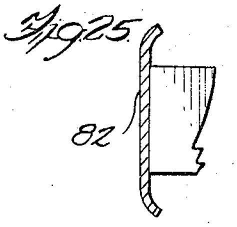
FIGURE 25 is a section view of the spring connecting latch taken along line 25—25, in FIG. 23.

In FIGS. 22–25 is shown a spring connecting latch 80, exemplary of a second embodiment of the invention, which may be fabricated from a single sheet of flat spring steel. The spring connecting latch 80 has the same U-shape as the previously described spring connecting latches, however, its profile is substantially rectangular in shape, rather than S-shaped. Each of the arms 81 of the spring connecting latch 80 has an outwardly extending flange 82, the profile of which may be seen in FIG. 25, formed at its mid-section and a tab 85 on its terminal end which function in the same manner as the outwardly curved sections 27 and the tangs 29, respectively, formed on the arms of the spring connecting latch 25, described above. Each of the arms of the spring connecting latch 80 also has a boss 84, as best seen in FIG. 23, projecting perpendicularly from its lower end. These bosses are tapered and notched, as best seen in FIG. 24, in the same fashion as the boss 67, shown in FIG. 17.

The actuator 81, in this case, is an eccentric shaft 86 which has a circular pivot shaft 87 formed on each of its ends. It may be noted that the pawls 16 on actuator 11 of FIG. 1 are eliminated, and a pair of pins 88 substituted in their stead. The actuator is simplified considerably with this arrangement, and may, therefore, be more easily manufactured.

The spring connecting latch 80 is rotatably secured to the actuator 81 by inserting the ends of the same in apertures (not shown) formed in the arms of the latch 80 and the pins 88 then secured in apertures in the eccentric shaft 86. This assembly is then installed in a panel member by inserting a pair of ferrules through holes which are pre-drilled in the panel member to engage the circular pivot shafts 87 formed on the eccentric shaft 86. The ferrules, as in the previously described cases, may be knurled, or threaded, for positive retention in the panel member, and act as both retainers and bearings for the circular pivot shafts 87 on the actuator 81.

The circular pivot shafts 87 formed on the eccentric shaft 86 have a hexagonal-shaped aperture formed therein for receiving the operating key to rotate the actuator 81 to engage the spring connecting latch 80 with the stationary rod installed in the other panel member, in a manner to be described hereinafter.

Figure 26:
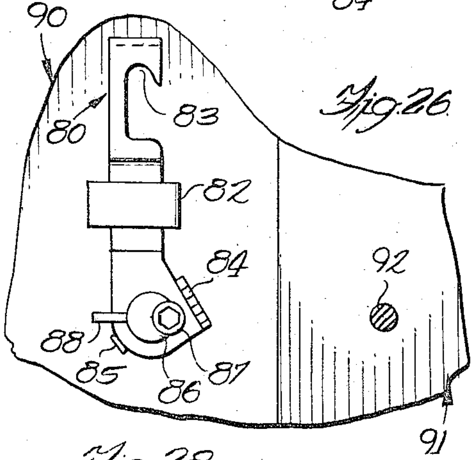
FIGURES 26–30 are plan views showing the actuator and the spring connecting latch in various stages of operation in connecting two panel members together.
Figure 27:
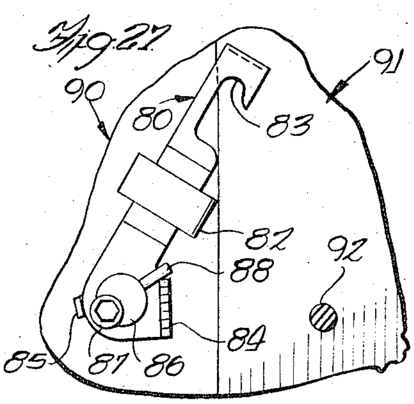
Figure 28:
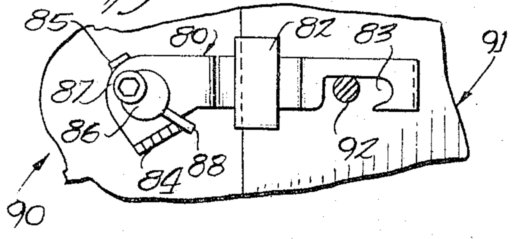
Figure 29:
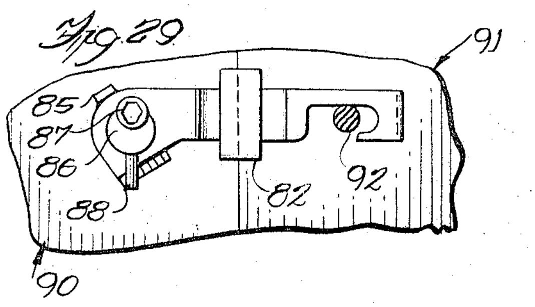
Figure 30:
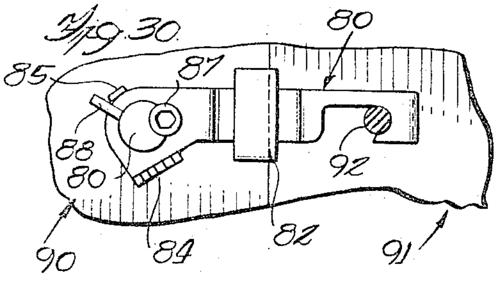

Referring now to FIGS. 26–30, the operation of the mechanism in attaching two panel members together is shown and will be described in detail. The panel members which are to be attached together, such as the panel members 90 and 91, are placed end to end, as shown in FIG. 26, and an operating key inserted in the hexagonal aperture in the circular pivot shafts 87 connected to the eccentric shaft 86, and rotated. In FIG. 26, the actuator 81 and the spring connecting latch 80 are shown in their fully retracted position, in the panel member 90. As the actuator 81 is rotated, the pins 88 on the eccentric shaft 86 engage the bosses 84 on the spring connecting latch 80, as shown in FIG. 27, to cause it to rotate with the actuator 81 until it contacts the stationary bar 92 in the panel member 91, as shown in FIG. 28. As the actuator 81 is rotated, the spring connecting latch 80 is lifted vertically, to a small degree, by the action of the eccentric shaft 86. Also, the frictional engagement of the latch 80 with the shaft 86 will cause it to start to rotate before the pins 88 engage the bosses 84, but the pins 84 are the primary motivation for rotating the latch.

As the spring connecting latch 80 is being rotated, the outwardly extending flanges 82 are forceably urged against the inner faces of the panel members 90 and 91 to automatically align these panels as the area of the outwardly extending flanges 82 are forced across the line of contact between the panels 90 and 91 being joined.

Once the spring connecting latch 80 has contacted the stationary bar 92, the pins 88 on the eccentric shaft 86 are no longer effective to force the spring connecting latch 80 any further through its arc of travel, since the latch 80 is substantially ridged, due to its construction. As the operator exerts continued force on the operating key, the pins 88 must continue to turn with the eccentric shaft 86 and they are therefore forced past the bosses 84 formed on the spring connecting latch 80. The notches in the bosses 84 provide an indication for the operator as to the location of the actuator 81 and latch 80, as the pins 88 travel past the bosses 84.

As the actuator 81 is rotated beyond approximately 180° from its initial position, the eccentric shaft 86, upon which the two arms of the spring connecting latch are secured, pulls the spring connecting latch 80 along with it in a substantially longitudinal direction, and the hooks 83 on the latch 80 are pulled into positive engagement with the stationary rod 92.

When the actuator 81 has been rotated to the point that the eccentric shaft has passed its point of maximum of distance from the stationary rod 92, the spring connecting latch 80 is under tension and tends to pull the shaft 86 towards the stationary shaft 92, thus aiding the eccentric shaft 86 in its travel. The tension on the spring connecting latch 80 would bring the eccentric shaft 86 around "full circle" if it were not for the locking tabs 85 formed on the terminal end of the arms of the spring connecting latch 80, which now engages the pins 88 and completely arrest further rotation. As in the previously described cases, when the pins 88 are in contact with the tabs 85 there is sufficient tension maintained on the spring connecting latch 80 to keep the ends of the panel members 90 and 91 in firm contact, and laterally aligned.

Disassemblying the panels is accomplished in the same manner as previously described. That is, the operating key is merely rotated in a counter-clockwise direction approximately 360° to fully retract the actuator 81 and the spring connecting latch 80 into the cut-out formed in the panel member 90. In this counter rotation, as the pins 88 slide past the bosses formed on the arms of the spring connecting latch 80 the spring connecting latch 80 is urged in a forward direction to disengage the hooks 83 from the stationary bar 92, and as the pins 88 engage the locking tabs 85 formed in the terminal ends of the arms the spring connecting latch 80 is rotated in a counter-clockwise direction.

It will thus be seen that the objects set forth above, among those made apparent from the preceding description, are efficiently obtained, and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what I claim as new and desire to secure by Letters Patent is:

1. Fastening means for removably securing together two panel members each of which has an opening for said fastening means in an end thereof and inner faces formed by said opening comprising, anchor means secured hidden within the opening in one of said panel members, actuator means secured hidden within the opening in the other one of said panels having a pivot and a pawl radially extending from said pivot, a shaft secured to said pawl so that it is offset from said pivot to provide an eccentric movement to said shaft upon rotation of said pawl, latching means secured at one end to said shaft and rotated by said actuator means to engage said anchor means, and means for rotating said actuator means, said eccentrically mounted shaft when rotated through its arc of excursion tensioning said latching means to forcibly urge the ends of said panel members together, said pawl having a tapered surface with a plurality of notches therein, said tapered surface slideably engaging said latching means to rotate the same and said notches providing an indication of the position of said actuator means with respect to said latching means.

2. Fastening means for removably securing together two panel members each of which has an opening for said fastening means in an end thereof and inner faces formed by said openings said fastening means comprising, an anchoring shaft secured hidden within the opening in one of said panel members, at least two actuator means secured hidden within the opening in the other one of said panel members, said actuator means each having a pivot and a pawl radially extending from said pivot, a shaft extending between said actuator means and secured to said pawls so that it is offset from said pivot to provide an eccentric movement to said shaft, and a substantially U-shaped latching means having a pair of arms each havhaving a profile which is substantially S-shaped, said arms each being secured at one end to said shaft, said latching means being rotated by said actuator means to engage said anchoring shaft, said eccentric shaft when rotated through its arc of excursion tensioning said latching means to forcibly urge the ends of said panel members together, said latching means having means thereon for engaging said inner faces of said two panel members to forcibly urge said two panel members in lateral alignment.

3. Fastening means as claimed in claim 2, wherein said substantially U-shaped latching means is comprised of spring wire.

4. The fastening means of claim 3 wherein said spring wire latching means has a loop formed in one end of each of said arms, said one end being extended and formed to provide a stop engageable by said pawl, said shaft being engaged with said loop to secure said spring latch thereto.

5. The fastening means of claim 4 wherein each of said arms having a portion thereof outset so as to engage the inner faces of said panel members to forcibly urge said panel members into lateral alignment.

6. Fastening means as claimed in claim 2, wherein said substantially U-shaped latching means is comprised of sheet spring stock material.

7. The fastening means of claim 2 wherein said latching means is formed of flat sheet spring stock material and the ends of each of said arms are reversely folded to form a loop for receiving said shaft therein, a stop integrally formed with said loops engageable by said pawl to arrest the rotation of said actuator means.

8. The fastening means of claim 7 wherein each of said arms having a portion thereof outset so as to engage the inner faces of said panel members to forcibly urge said panel members into lateral alignment.

9. Fastening means for removably securing together two panel members each of which has an opening for said fastening means in an end thereof and inner faces formed by said opening comprising, anchor means secured hidden within the opening in one of said panel members, eccentric means secured hidden within the opening in the other one of said panel members, a substantially U-shaped latching means having a pair of arms each having a profile which is substantially S-shaped, said arms each being secured at one end thereof to said eccentric, and means for rotating said eccentric through its arc of excursion of engage said latching means with said anchor means and to urge said latching means longitudinally to lock the same together to secure the ends of said panel members together, said arms of said latching means each having a portion thereof offset so as to engage said inner faces of said two panel members to forcibly urge said two panel members in lateral alignment.

10. Fastening means for removably securing together two panel members each of which has an opening for said fastening means in an end thereof and inner faces formed by said opening comprising, anchor means secured hidden within the opening in one of said panel members, a shaft having an offset pivot on each of its ends so as to provide an eccentric secured hidden within the opening in the other one of said panels, latching means having tapered bosses formed thereon secured at one end to said shaft, a pair of pins secured to said shaft for retaining said latching means on said shaft and for engaging said bosses to rotate said latching means to engage said anchor means when said shaft is rotated, said shaft when rotated through its arc of excursion urging said latching means longitudinally to forcibly lock said latch means and said anchor means together to thereby secure the ends of said panel members together.

11. Fastening means for removably securing together two panel members each of which has an opening for said fastening means in an end thereof and inner faces formed by said opening comprising, anchor means secured hidden within the opening in one of said panel members, eccentric means secured hidden within the opening in the other one of said panel members, said eccentric means comprises a pair of actuator means each having a pivot, a pawl radially extending from said pivot and a shaft extending between said actuators and secured to said pawls so that it is offset from said pivot to provide an eccentric movement to said shaft, latching means having one end thereof secured to said eccentric means, and rotating means for rotating said eccentric means and said attached latching means through their arc of excursion, said latching means engaging said anchor means and being tensioned to resiliently and forcibly urge said ends of said panel members together, said latching means having means thereon for engaging said inner faces of said two panel members to forcibly urge said two panel members in lateral alignment.

12. Fastening means as claimed in claim 11, wherein said pawls are removably secured to said shaft, whereby different length shafts may be used in accordance with the width of said panel members.

13. Fastening means for securing together two objects comprising anchor means secured to one of said objects, eccentric means secured to the other one of said objects, a substantially S-shaped spring having a loop formed in one end thereof receiving said eccentric means therein, cam means operated by said eccentric means to engage and to rotate said spring through its arc of excursion to engage said anchor means, the eccentricity of said eccentric means and cam means in a first predetermined position tensioning said spring to resiliently and forcibly urge said object together, and in a second overcenter position of said eccentric means the tension of said spring in combination with the eccentricity of said eccentric means causing said eccentric means to be forcibly urged in the same direction of rotation to a position at which its rotation is arrested to effectively lock said spring in a positive forced engagement with said anchor means whereby said two objects are forcibly and resiliently urged together.

14. Fastening means, as claimed in claim 13, wherein said two objects comprise panel members, each having an opening for said fastening means in an end thereof and inner faces formed by said openings, and wherein said spring has means thereon for engaging said inner faces of said two panel members to forcibly urge said two panel members in lateral alignment.

References Cited by the Examiner

UNITED STATES PATENTS

| | | | |
|---|---|---|---|
| 2,738,211 | 3/1956 | Schlueter | 292—111 |
| 2,741,341 | 4/1956 | Anderson | 287—20.92 |
| 2,746,098 | 5/1956 | Cooper | 287—20.92 |
| 2,913,775 | 11/1959 | Sailor. | |
| 3,048,435 | 8/1962 | Demarco | 292—111 |
| 3,191,244 | 6/1965 | Burke | 287—20.92 |

FRANK L. ABBOTT, *Primary Examiner.*

R. A. STENZEL, C. G. MUELLER, *Assistant Examiners.*